United States Patent [19]

Heidrich et al.

[11] 4,042,301
[45] Aug. 16, 1977

[54] APPARATUS FOR SUPPORTING AND POSITIONING WEBS OF PHOTOGRAPHIC MATERIAL IN COPYING MACHINES

[75] Inventors: Günter Heidrich; Christian Götze, both of Munich, Germany

[73] Assignee: AGFA-Gevaert, A.G., Leverkusen, Germany

[21] Appl. No.: 616,073

[22] Filed: Sept. 23, 1975

[30] Foreign Application Priority Data

Sept. 26, 1974 Germany .............................. 2445997

[51] Int. Cl.$^2$ ............................................. G03B 27/62
[52] U.S. Cl. ......................................... 355/75; 355/41
[58] Field of Search ....................... 354/212, 213, 215; 355/50, 41, 76, 75, 72, 73, 74; 352/136, 137, 138

[56] References Cited

U.S. PATENT DOCUMENTS

| | | | |
|---|---|---|---|
| 3,288,027 | 11/1966 | Ruzicka | 355/75 |
| 3,464,336 | 9/1969 | Rovsek | 352/137 X |
| 3,874,791 | 4/1975 | Thieme et al. | 355/41 |

FOREIGN PATENT DOCUMENTS

| | | | |
|---|---|---|---|
| 676,458 | 1/1939 | Germany | 355/76 |

*Primary Examiner*—Edna M. O'Connor
*Attorney, Agent, or Firm*—Michael J. Striker

[57] ABSTRACT

Apparatus for positioning exposed and developed photographic roll films in a copying machine has a base which is formed with an exposure window and supports a removable cover, an advancing roll for photographic films, a first set of claws which can enter the perforations of a section of a roll film when the section is inserted and moved lengthwise by hand, and a second set of claws which can be used to position manually inserted webs of different films film webs which are bonded to data-carrying strips. The cover thereby retracts or depresses the first set of claws so that they cannot interfere with automatic transport of roll films. The claws of the second set are held in retracted positions by a removable insert which carries the first set of claws and the advancing roll and which is replaceable by a second insert when the apparatus is to position manually inserted different films which are bonded to data carrying strips. The second insert has apertures through which the claws of the second set extend so that they can enter the perforations of such different films.

11 Claims, 6 Drawing Figures

APPARATUS FOR SUPPORTING AND POSITIONING WEBS OF PHOTOGRAPHIC MATERIAL IN COPYING MACHINES

BACKGROUND OF THE INVENTION

The present invention relates to improvements in apparatus for supporting and positioning photographic material in copying machines. More particularly, the invention relates to improvements in apparatus for supporting and positioning discrete photographic roll films, a series of photographic roll films which are spliced to each other end-to-end, or sections of discrete photographic roll films during exposure of selected or successive film frames for the purpose of making reproductions on photographic paper or the like. Still more particularly, the invention relates to improvements in apparatus for supporting and positioning perforated photographic roll films in a photographic copying machine wherein selected film frames register with a window and are illuminated by light during reproduction of their images onto a layer of photosensitive material which coats one side of a strip of printing paper or the like.

A photographic copying machine must be provided with an apparatus or device for properly positioning selected or successive film frames in register with the light-transmitting window and for maintaining such frames in a predetermined plane. This insures the making of satisfactory prints as regards the contrast and/or other characteristics of reproduced images. The just mentioned apparatus must be further capable of rapidly locating the film in an optimum position for engagement with automatic advancing means and for holding the film frame which registers with the window in an optimum position, as considered longitudinally as well as transversely of the film. To this end, many types of roll films are provided with perforations in the form of holes or notches, preferably at least one for each film frame. Such perforations can also serve to facilitate the transport and/or positioning of film frames in a still camera or motion picture camera, i.e., before the film is developed and thereupon introduced into a copying machine.

Certain film positioning and supporting apparatus for use in high-speed copying machines already comprise detector means for scanning the perforations and for regulating the operation of automatic film advancing means. Suitable detector means is disclosed in commonly owned U.S. Pat. No. 3,874,791 granted Apr. 1, 1975 to which reference may be had, if necessary. However, it is often desirable to insert and advance a section or a full length of photographic roll film by hand, for example, when the customer returns a section of film for the making of more satisfactory or additional prints. Such sections (e.g., sets of four film frames) are normally too short to be properly transported by automatic advancing means which is used primarily for the transport of webs consisting of a large number of spliced-together photographic roll films immediately after the films issue from a developing machine. Furthermore, even if the sections are not too short for automatic transport, it would be more time-consuming to properly thread such sections into the automatic advancing means than to position successive film frames of a single section (or a small number of sections) by hand. Still further, certain types of photographic film are bonded or otherwise connected to data-carrying strips of paper or the like; such films have perforations along the "wrong" marginal portions, i.e., not along those marginal portions which are formed with perforations in a roll film without a data carrying strip.

SUMMARY OF THE INVENTION

An object of the invention is to provide an apparatus which can properly support and position originals constituting continuous or discrete webs as well as relatively short sections of discrete web-shaped originals, especially photographic roll films.

Another object of the invention is to provide an apparatus which can transport originals (such as elongated photographic roll films) in a fully automatic way and which also permits of manual insertion and transport of originals.

A further object of the invention is to provide an apparatus whose versatility greatly exceeds that of heretofore known apparatus and which can be used with advantage for positioning and manual or automatic transport of relatively wide or relatively narrow originals.

An additional object of the invention is to provide an apparatus which can be rapidly converted for automatic transport or manual handling of films, wherein the conversion from one type of operation to another type of operation involves the replacement and/or adjustment of a minimal number of parts so that the apparatus can be operated by semiskilled or unskilled persons, and which enables the user to make copies from several types of films, such as films having regular or miniature film frames.

Still another object of the invention is to provide an apparatus which can be installed in existing copying machines as a superior substitute for conventional apparatus.

A further object of the invention is to provide an apparatus wherein claws, teeth, pins or analogous positioning means which are used during manual insertion and transport of discrete webs of photographic film or sections of a web of photographic film are automatically deactivated (e.g., retracted) when the apparatus is to automatically transport a series of interconnected webs.

The invention is embodied in an apparatus for supporting and positioning perforated webs of photographic material in a copying machine, for example, for automatically or manually positioning originals which constitute sections of discrete photographic roll films, discrete roll films, or continuous strips consisting of two or more discrete roll films which are spliced to each other end-to-end. The apparatus comprises a base (e.g., a horizontal platform which is secured to an adjustable and/or interchangeable mount for the objective in a photographic copying machine), web advancing means installed in the base (such web advancing means may comprise a roll which is mounted in a removable portion or insert of the base and is driven by a motor controlled by a detector in a manner as disclosed in U.S. Pat. No. 3,874,791), a holder (e.g., a pivotably and/or removably mounted cover) which is movable with respect to the base between first and second positions and has means (e.g., a complementary roll) for rendering the advancing means operative in the first position of the holder, and web positioning means (e.g., a pair of claws) installed in the base (preferably in the aforementioned removable portion or insert) to extend into the perforations of a web (e.g., a section of photographic roll film) which is inserted and advanced by hand. The positioning means is movable between extended and retracted positions and is preferably biased to extended position by a leaf spring or the like, and the apparatus further comprises means for retracting the positioning means in response to movement of the holder to the first position so that the positioning means is ineffective when the advancing means is operative and vice versa. The means for retracting the positioning means may comprise a panel which is rigid with the positioning means and has a feeler or scanning means extending into the path of movement of the holder to the first position so that the panel automatically retracts the positioning means when the holder assumes its first position. The holder can be held in such first position by a permanent magnet or the like.

The improved apparatus can be further designed for use with manually insertable perforated webs having data carrying strips. The apparatus then comprises a pressure plate which normally overlies an exposure window in the base, additional positioning means (e.g., two additional claws) which is movable with respect to the base between extended and retracted positions to enter the perforations of a manually inserted web having a data carrying strip when in extended position, first resilient means (e.g., a relatively weak helical spring) for biasing the additional positioning means to retracted position with a first force, second resilient means (e.g., a relatively strong leaf spring) which is actuatable to bias the additional positioning means to the extended position with a greater second force, and means for actuating the second resilient means when the pressure plate overlies the window. The actuating means may be a stud or the like which is mounted on the pressure plate.

The apparatus preferably further comprises an electromagnet which is energized during the making of an exposure (i.e., during imaging of that frame or portion of the web which registers with the window) and which automatically moves the pressure plate from a first to a second position whereby a clamping member on the pressure plate bears against and locates the frame to be imaged in a predetermined plane by urging the marginal portions of such frame against the base. When the pressure plate assumes its first position (in which it can be held yieldable biasing means including a permanent magnet and a soft-iron plate or disk movably mounted in the base), it defines with the base a passage whose width is sufficient to allow for lengthwise transport of webs which are connected to each other by relatively thick (rolled or adhesively applied) splices.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Referring first to FIGS. 1 to 4, there is shown an apparatus which comprises a platform or base 1 secured to a mount 102. The latter is adjustably and/or removably installed in a photographic copying machine and preferably comprises an extension or bracket 102a (FIG. 6) for a lens 35. When the copying machine is to be converted from the making of prints from one type of originals to the making of prints from another type of originals, the entire mount 102, together with the lens 35, can be replaced with a different mount. The exact manner in which the mount 102 is adjustably secured to the frame or housing of the copying machine forms no part of the invention.

Figure 1:
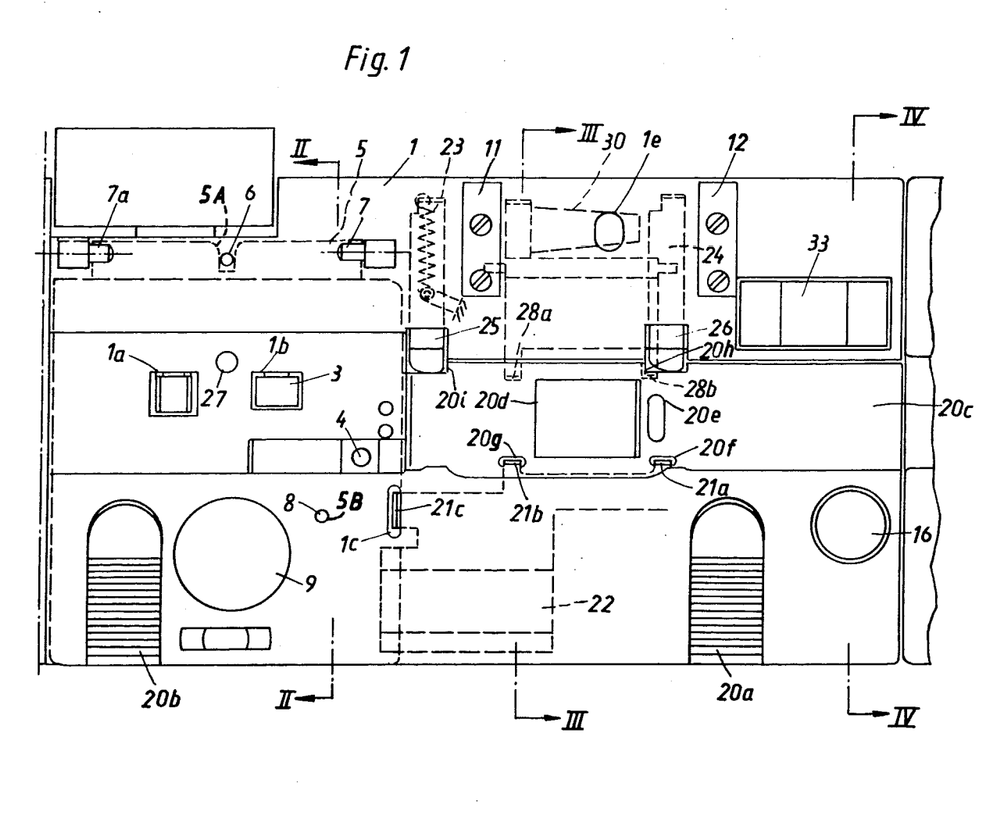
FIG. 1 is a schematic view of an apparatus which embodies the invention.
Figure 2:
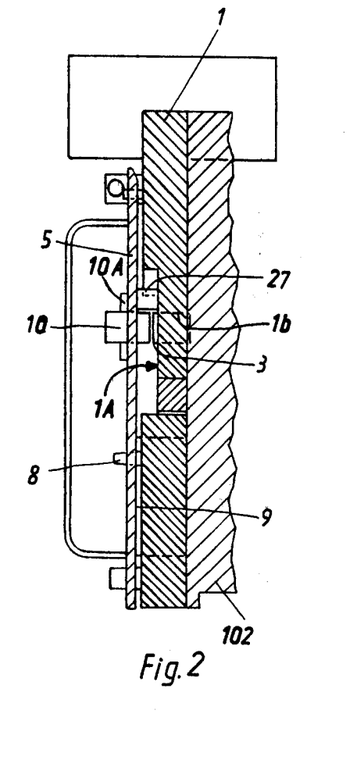
FIG. 2 is a sectional view as seen in the direction of arrows from the line II—II of FIG. 1.
Figure 3:
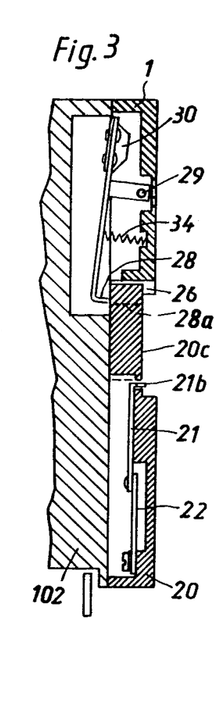
FIG. 3 is a sectional view as seen in the direction of arrows from the line III—III of FIG. 1.
Figure 4:
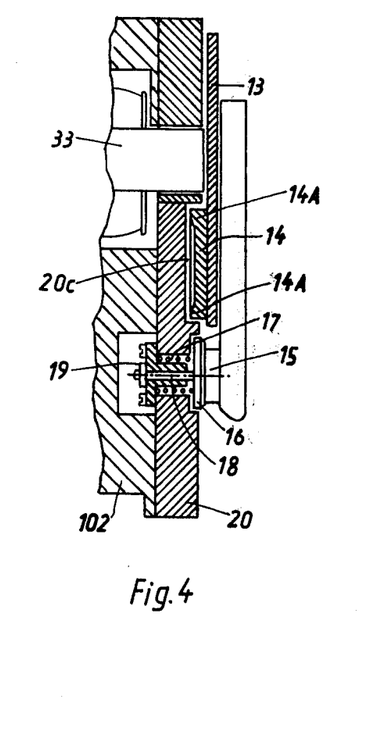
FIG. 4 is a sectional view as seen in the direction of arrows from the line IV—IV of FIG. 1.

The platform 1 has openings 1a, 1b which are located upstream of an exposure window 20d. That frame of a photographic film which registers with the window 20d is imaged onto the photosensitive layer of a web of photographic paper, not shown, when the illuminating system of the copying machine directs light through or against the respective film frame. The openings 1a and 1b respectively receive portions of a distance measuring or metering roll 2 and a film advancing roll 3. The top portions of the rolls 2 and 3 extend slightly beyond the upper surface 1A (FIG. 2) of the platform 1; the surface 1A supports one side of the film when the latter is properly threaded through the copying machine. The means for terminating the transport of film via advancing roll 3 (in a direction from the left to the right, as viewed in FIG. 1) comprises a detector including a so-called Y-conductor of light which is of the type similar to or identical with that shown in FIG. 3 of U.S. Pat. No. 3,874,791 to Thieme et al. One terminal 4 of the Y-conductor is movably secured to the platform 1 downstream of the opening 1b so that it faces a light trap (not specifically shown) in the underside of a plate-like removable metallic holder or cover 5. The outline of the cover 5 is indicated in FIG. 1 by broken lines. The light trap corresponds to the light trap 24 shown in FIG. 3 of the patent to Thieme et al; its function is to prevent reflection of light into the terminal 4 when the latter is in register with a perforation of film on the upper surface 1A of the platform 1. This causes the detector including the Y-conductor to transmit a signal which arrests the prime mover (e.g., an electric motor) for the advancing roll 3.

The cover 5 has a notch 5A and a hole 5B. When the cover 5 is properly mounted on the platform 1 (so that it overlies the surface 1A) its notch 5A receives a stationary pin 6 and its hole 5B receives a stationary pin 8 of the platform 1. Also, the marginal portions of the cover 5 (at the opposite sides of the notch 5A) are located below horizontal pins 7, 7a on the platform 1. The means for retaining the cover 5 in requisite position comprises a permanent magnet 9 on the platform 1. In order to remove the cover 5, the operator must pivot the cover about a substantially horizontal axis (as viewed in FIG. 1) which is parallel to the common axis of the horizontal pins 7, 7a so that the lower edge portion of the cover is moved away from the magnet 9 and the hole 5B is lifted above the pin 8. The cover 5 is then ready to be removed by moving its upper edge portion downwardly, as viewed in FIG. 1, i.e., clear of the pins 7, 7a whereby the notch 5A moves away from the pin 6. It is sufficient to mount in or on the cover 5 a relatively small metallic plate or block which is magnetizable and is located adjacent to the magnet 9 when the cover 5 is properly attached to the platform 1.

The underside of the cover 5 is formed with the aforementioned light trap which is located opposite the terminal 4 when the cover is properly mounted on the platform 1. The cover 5 further carries two complementary rolls or pressure rolls 10 (only one shown in FIG. 2) which render the rolls 2 and 3 operative by preventing slippage of film during transport by the roll 2 when the cover is held in the (first) position shown in FIG. 2. The rolls 10 are preferably mounted in spring-biased bearings 10A so that their peripheral surfaces yieldably bear against the upper side of a web of film which extends between the surface 1A and the underside of the cover 5.

Figure 5:
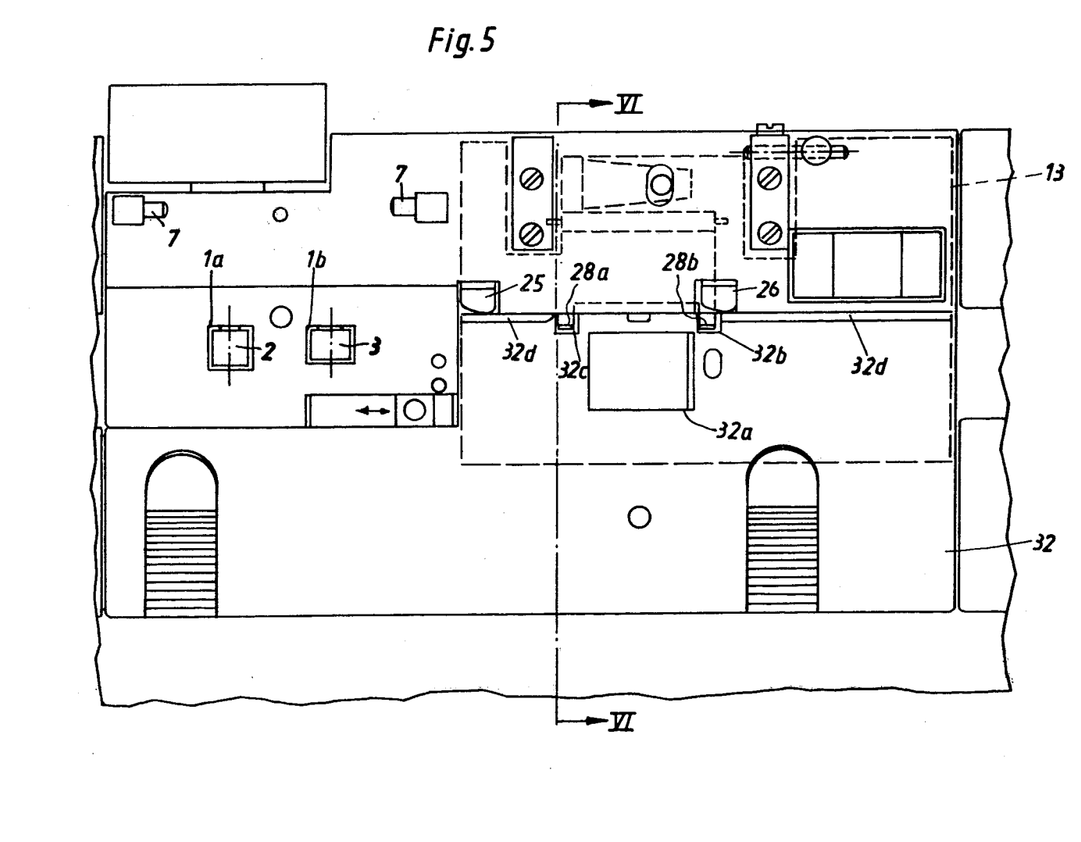
FIG. 5 is a plan view of the apparatus but with a different insert in the major portion of the base.

The upper marginal portion of the platform 1 (as viewed in FIG. 1) carries two bearing brackets 11, 12 for the pintle of a hinge (not specifically shown) which serves as a means for pivotably connecting the platform 1 with a pressure plate 13. The outline of the pressure plate 13 is shown in FIG. 5 by broken lines. This plate overlies the exposure window 20d in an insert 20 which is detachably held in a suitable socket of the platform 1 by two locking elements or catches 20a, 20b shown in the lower portion of FIG. 1. The underside of the pressure plate 13 carries an elongated film clamping member 14 (see FIG. 4) having longitudinally extending marginal portions 14A which bear against the marginal portions of the film. The lower portion of the pressure plate 13 (as viewed in FIG. 1 or 5) carries a permanent magnet 15 which can attract a soft-iron disk or plate 16 reciprocably mounted in the insert 20. The latter can be said to constitute a removable or interchangeable portion of the platform 1 which further comprises a main portion affixed to the mount 102 and removably supporting the insert 20. The disk 16 is biased toward the magnet 15 by a helical spring 17 which is mounted in the insert 20 and surrounds an axially movable guide post 18 rigid with the disk 16. A flange at the rear or inner end of the post 18 abuts against a washer-like stop 19 which is mounted at the inner end of a bearing sleeve for the post. When the pressure plate 13 assumes the (first) position shown in FIG. 4, the clamping member 14 at its underside is located at a predetermined distance from a film channel 20c which is machined into the upper side of the removable insert 20. The disk 16 will descend against the opposition of the spring 17 if the pressure plate 13 is pivoted clockwise, as viewed in FIG. 4, to a second position whereby the magnet 15 depresses the parts 16, 18 and 9. Such pivoting of the plate 13 can be effected in response to short-lasting energization of an electromagnet 13 which is mounted in the platform 1; the pressure plate 13 can be said to constitute a pivotable armature of the electromagnet 33 which is energized during the making of exposures. The parts 15 – 19 constitute means for biasing the pressure plate 13 to the first position of FIG. 4 in which the passage between the clamping member 14 of the pressure plate and the insert 20 is wide enough to allow for unimpeded transport of splices between the ends of neighboring roll films.

The insert 20 is further formed with a cutout or slot 20e located downstream of the window 20d and permitting observation of a number applied to the film and identifying that film frame which is in register with the window. Still further, the insert 20 is formed with slit-shaped apertures 20f, 20g which are respectively located immediately downstream and upstream of the window 20d (see FIG. 1) and register with preferably wedge-shaped (triangular) positioning claws 21a, 21b provided on a sheet metal panel 2 mounted on and located at the underside of the insert 20. The apertures 20f, 20g are in line with perforations of film in the channel 20c. The panel 21 is elastic or is yieldably mounted on the insert 20 so that its positioning claws 21a, 21b can be depressed to retracted positions in which they are located a level below the bottom surface of the channel 20c. The claws 21a, 21b may constitute upwardly bent portions or lugs of the generally horizontal panel 21 which is yieldably secured to the insert 20 by a leaf spring 22 so that the claws 21a, 21b can be depressed into the apertures 20f, 20g in response to exertion of a small force. The front sides of the claws 21a, 21b (namely, those sides which face in a direction to the left, as viewed in FIG. 1) are preferably curved or sloped upwardly so that they offer little resistance to lengthwise transport of a film in the channel 20c. However, the resistance of the claws 21a, 21b to further forward movement of film increases abruptly when the tips of these claws are permitted to penetrate into oncoming perforations of the film, provided that the pressure plate 13 is held in the first or second position.

The panel 21 for the claws 21a, 21b further carries a third bent-over lug or projection 21c which constitute a feeler or scanning means and extends upwardly through an opening 1c in the platform 1 in the region below the cover 5. The length (i.e., height) of the feeler 21c is selected in such a way that this feeler is depressed by the properly inserted cover 5 (when the latter is attracted by the permanent magnet 9) whereby the panel 21 assumes a position in which the claws 21a, 21b are retracted, i.e., located below the plane of roll film in the channel 20c. In other words, the positioning claws 21a, 21b cannot extend into the perforations of a film between the insert 20 and the clamping member 14 when the cover 5 is held by the magnet 9.

The upper marginal portion of the insert 20 (as viewed in FIG. 1 to 4) is formed with cutouts 20h, 20i which are respectively located opposite the apertures 20f, 20g and serve to receive the working ends of pushers 26, 25 which are biased by suitable springs 24, 23 so that they bear against the adjacent marginal portion of photographic film in the channel 20c. The pushers 25, 26 extend upwardly beyond the bottom surface of the channel 20c (see FIG. 3) so as to insure that the perforations of the film are in line with the apertures 20f, 20g and positioning claws 21a, 21b.

The platform 1 has a vertical hole or bore 1d which is disposed between the openings 1a, 1b and receives a stud 27 biased by suitable resilient means (not shown) so that it tends to move upwardly. The stud 27 is in line with the deepmost portions of cutouts 20h, 20i and serves to guide the adjacent marginal portion of photographic film in the region of rolls 2, 3 and 10. Also, the stud reduces the likelihood of buckling of film below the cover 5.

Figure 6:
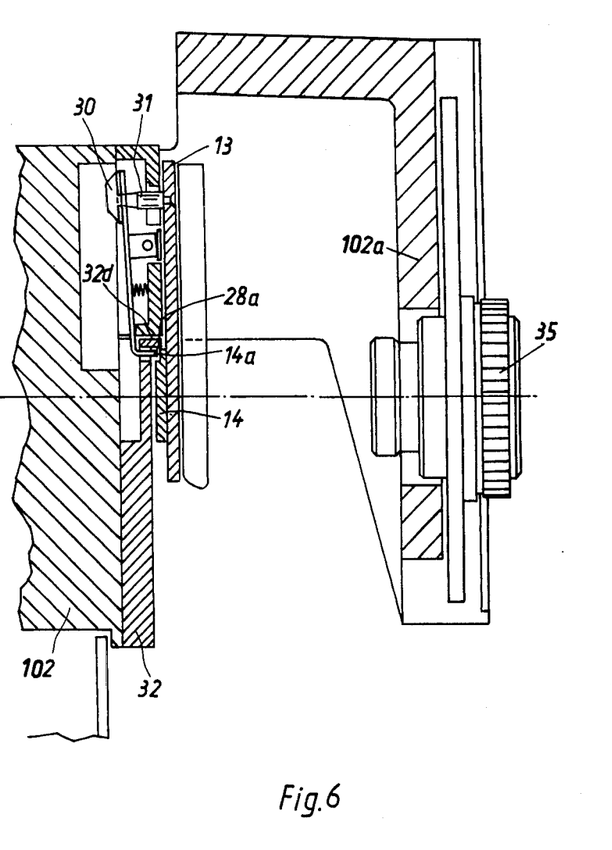
FIG. 6 is a sectional view as seen in the direction of arrows from the line VI—VI of FIG. 5.

The platform 1 further supports a second sheet metal panel 28 which constitutes a carrier for two additional positioning claws 28a, 28b respectively located upstream and downstream of the window 20d. The panel 28 resembles a two-armed lever which is fulcrumed in the platform 1, as at 29 (see FIG. 3) and one arm of which is provided with the positioning claws 28a, 28b. The other arm of the panel 28 is connected to a relatively strong leaf spring 30 which has a portion located below an opening 1e in the platform 1. The opening 1e is located between the bearing members 11 and 12 (see FIG. 1). FIG. 6 shows that the pressure plate 13 carries an actuating or depressing pin 31 which is in register with the opening 1e and depresses the other arm of the panel 28 when the pressure plate 13 is moved to and held in the first position. The pin 31 thereby tends to move the positioning claws 28a, 28b upwardly to extended positions. However, since the insert 20 does not have any openings or slots in register with the claws 28a, 28b, the pin 31 merely flexes the leaf spring 30 but the claws 28a, 28b do not extend into the channel 20c. The one arm of the panel 28 is biased clockwise, as viewed in FIG. 3, by a weak helical spring 34. The actuating pin 31 is riveted to the pressure plate 13.

The situation is different when the apparatus is used to locate a different film especially of the 110 type which is bonded to an information or data of the order bearing paper strip and has perforations along that marginal portion which is in line with the additional positioning claws 28a, 28b. The insert 20 is then replaced with an insert 32 which is shown in FIGS. 5 and 6. This insert can be secured to the main portion of the platform 1 by clips (shown in FIG. 5) analogous to the clips 20a, 20b of the insert 20. The insert 32 has a window 32a (corresponding to the window 20d of the insert 20) and two apertures 32b, 32c which are respectively located downstream and upstream of the window 32a (see FIG. 5) and are in register with the claws 28a, 28b. Thus, when the pressure plate 13 is held in the first position by biasing means 15 - 19, the actuating pin 31 can pivot the panel 28 counterclockwise, as viewed in FIG. 6, so that the claws 28a, 28b can penetrate into the film channel by passing through the apertures 32b, 32c and assume their extended positions.

The feature that the mount 102 carries a bracket 102a (FIG. 6) for the lens 35 is particularly advantageous if the copying machine is designed to make reproductions of images of miniature film frames. Such reproductions are satisfactory only if the distance between the film frame which registers with the window 20d or 32a and the lens is selected with a very high degree of precision. This can be readily achieved if the lens is mounted on a portion of the mount 102 which, in turn, supports the platform 1 and the film guiding, positioning and clamping components on the platform. The mount 102 can further support a photoelectric transducer of the automatic exposure control. The mount 102 is preferably replaced together with the platform 1 so that the conversion of copying machine from the making of copies from one type of film frames to the making of copies from another type of film frames takes up a very short interval of time. Also, such arrangement renders it unnecessary to make any changes in connection with parts which are mounted on the platform.

The operation:

The apparatus can be used in connection with a continuous web of photographic film which consists of several discrete roll films connected to each other end-to-end in a manner customary from the art of transporting a series of exposed roll films through a developing machine. Alternatively, the apparatus can be used with short sections of photographic films, e.g., sections consisting of four or six frames. Such sections must be inserted into the copying machine if the original prints are unsatisfactory of when a customer orders additional prints of selected film frames. As a rule, the relatively long web of roll film which is sent in or delivered by a customer to a processing laboratory is developed, used for the making of prints and subdivided into relatively short sections prior to being returned to the customer. Still further, the apparatus can be used in connection with aforementioned different films which are bonded to data bearing strips made of paper or the like.

When the apparatus is used to advance and locate successive frames of a relatively long web consisting of several photographic roll films which are spliced together end-to-end, the advancing roll 3 is arrested at intervals in automatic response to signals from the detector including the terminal 4. As disclosed in U.S. Pat. No. 3,784,791 to Thieme et al, the detector produces a signal whenever the terminal does not receive reflected light (light is being reflected by the film) because this terminal is in register with a perforation so that the aforementioned light trap in the cover 5 absorbs light issuing from the terminal 4. The cover 5 is mounted in the aforedescribed first position and is retained in such position by the permanent magnet 9 on the platform 1. Therefore, the rolls 10 render the rolls 2 and 3 operative in a manner as disclosed in U.S. Pat. No. 3,874,791. The disk 16 cooperates with the magnet 15 to maintain the clamping member 14 at a preselected distance from the channel 20c; Such distance suffices to allow for unimpeded passage of splices between successive discrete roll films of the continuous web. The electromagnet 33 is energized during the making of a print (i.e., during imaging of that film frame which is in register with the window 20d) to thus insure that the marginal portions 14A of the clamping member 14 bear against the adjacent marginal portions of the film in the channel 20c and thereby guarantee that the film is held in a predetermined plane at an optimum distance from the lens 35. Moreover, the marginal portions 14A prevent buckling, curling or other deformation of film in the channel 20c. The cover 5 bears against the feeler 21c so that the positioning claws 21a, 21b are held in retracted positions at a level below the plane of film in the channel 20c; These claws are not needed since the detector including the terminal 4 can insure accurate register of successive film frames with the window 20d.

If the apparatus is to locate the aforementioned sections of photographic roll films (without data carrying strips), the sections of roll films are inserted by hand. The cover 5 is removed (i.e., moved to a second position) to thereby deactivate the detector (terminal 4) and rolls 2, 3 because the light trap and the complementary rolls 10 are removed with the cover. Also, the stud 27 is free to extend upwardly through the hole 1d of the platform 1 so that it can guide the upper marginal portion of an inserted section, as viewed in FIG. 1. The cover 5 also ceases to maintain the feeler 21c of the panel 21 in depressed position so that the positioning claws 21a, 21b are free to extend through and upwardly beyond the respective apertures 20f, 20g of the insert 20 and assume their extended positions. The pressure plate 13 is held in first position by the magnet 15. A section of photographic roll film can be inserted into the channel 20c in a direction from the left or from the right, as viewed in FIG. 1, and a selected frame of such section is properly centered above the window 20d when the positioning claws 21a, 21b enter the adjacent perforations of the film section. When the copying machine is to make an exposure, the electromagnet 33 is energized to move the pressure plate 13 to second position and to cause the marginal portions 14A of the clamping member 14 to bear against the adjacent marginal portions of the section therebelow. The additional positioning claws 28a, 28b are ineffective because the insert 20 does not have any apertures, such as the apertures 32b, 32c of the insert 32.

Films which are bonded to data carrying paper strips are manipulated as follows:

The perforations of such films are adjacent to the upper portion of the film channel, as viewed in FIG. 5, i.e., they are not in line with the positioning claw 21a, 21b but rather with the additional positioning claw 28a, 28b. A film which is bonded to a data carrying strip is conveyed individually, i.e., it is not spliced with similar films to form a continuous web. The frames of such film are nearer to the lower edge of the channel.

The pushers 25, 26 are held in retracted positions and the stud 27 is held in depressed position. The pushers 25, 26 are automatically retracted in response to proper mounting of the insert 32 in the platform 1. The individual roll film which is bonded to a data carrying strip is guided by an upwardly extending ledge 32d of the insert 32; such ledge replaces pushers 25, 26 and the stud 27 and maintains the pushers in inoperative positions. When the pressure plate 13 is moved to first position, its actuating pin 31 pivots the panel 28 so that the additional positioning claws 28a, 28b extend upwardly through and beyond the apertures 32b, 32c of the insert 32 while the one arm of the panel 28 stresses the relatively weak spring 34. The leaf spring 30 is strong enough to overcome the bias of the weaker spring 34 when the pin 31 assumes the position shown in FIG. 6 and the insert 32 is properly mounted in the main portion of the platform 1 so that its apertures 32b, 32c register with the additional positioning claws 28a, 28b. The film is shifted lengthwise by hand because its perforations are not in line with the terminal 4 of the detector.

The improved apparatus is susceptible of many modifications without departing from the spirit of the invention. For example, the apparatus can be simplified by using only the insert 20 so that the apparatus can serve for automatic transport of spliced-together photographic roll films or for manual insertion and transport of relatively short sections of roll films. Furthermore, the apparatus can be furnished with discrete inserts for use with narrow films having miniature film frames or with films of greater width (e.g., with 24×36 millimeter frames).

An important advantage of the improved apparatus is that it can be manipulated by semiskilled or even unskilled persons. This is due to the fact that the means for automatically advancing and locating film frames are disengaged or rendered inoperative in automatic response to movement of the cover 5 to second position, that the claws 21a, 21b are allowed to assume their extended positions only when the cover 5 is moved to second position, and that the additional claws 28a, 28b are allowed to assume their extended positions only when the insert 20 is replaced with the insert 32. Also, the stud 27 is allowed to extend beyond the upper side of the platform 1 only when the cover 5 is moved to second position, and the parts 27, 26, 25 are deactivated in automatic response to replacement of the insert 20 with the insert 32.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. Apparatus for supporting and positioning perforated webs of photographic material in a copying machine in selectable automatic or manual operating modes, comprising a base; web advancing means installed in said base; a holder movable with respect to said base between a first position which it assumes when said apparatus operates in the automatic mode, and a second position which it assumes when the apparatus operates in the manual mode; means on said holder for rendering said advancing means in said base operative only when said holder is in said first position; web positioning means installed in said base to extend into the perforations of a web which is inserted and advanced by hand, said web positioning means being movable between an extended operative position which it assumes when said apparatus operates in the manual mode and a retracted inoperative position; and means for retracting said web positioning means in response to movement of said holder to said first position in which said apparatus operates in said automatic mode so as to prevent interference of said web positioning means with webs advanced by said web advancing means which are rendered operative when said holder is in said first position.

2. Apparatus as defined in claim 1, further comprising means for biasing said positioning means to said extended position.

3. Apparatus as defined in claim 1, further comprising a mount for said base and a lens for imaging a web on said base, said lens being rigid with said mount.

4. Apparatus as defined in claim 3, further comprising photoelectric transducer means supported by said mount, said mount being adjustably mounted in a copying machine.

5. Apparatus for supporting and positioning manually insertable perforated webs of photographic material having data carrying strips in a copying machine, comprising a base; web advancing means installed in said base; a holder movable with respect to said base between a first and second position and having means for rendering said advancing means operative in said first position of said holder; web positioning means installed in said base to extend into the perforations of a web which is inserted and advanced by hand, said positioning means being movable between extended and retracted positions; means for retracting said positioning means in response to movement of said holder to said first position; a pressure plate normally overlying an exposure window in said base; additional positioning means movable with respect to said base between extended and retracted positions to enter the perforations of a manually inserted web having a strip when in said extended position; first resilient means for biasing said additional positioning means to said retracted position with a first force; second resilient means actuatable to bias said additional positioning means to said extended position with a greater second force; and means for actuating said second resilient means when said pressure plate overlies said window.

6. Apparatus as defined in claim 5 wherein said actuating means is mounted on said pressure plate.

7. Apparatus as defined in claim 5 for use of webs having frames one of which is in register with said window when the web is properly positioned with respect to said base, further comprising electromagnet means mounted in said base and being energizable during exposure of the frame which is in register with said window, said pressure plate being movable by said electromagnet means from a first to a second position in response to energization of said electromagnet means, said pressure plate and said base defining for the web a relatively wide passage in the first position of said pressure plate and said pressure plate having means for clamping the web against said base in said second position of said pressure plate.

8. Apparatus as defined in claim 7, further comprising means for yieldably holding said pressure plate in said first position.

9. Apparatus as defined in claim 5, wherein said base comprises a main portion and a second portion removably mounted in said main portion, said first mentioned positioning means being installed in said second portion and said second portion being located in the path of movement of said additional positioning means to said extended position so that said additional positioning means can assume said extended position thereof only when said second portion is removed.

10. Apparatus as defined in claim 9, further comprising an additional second portion which is connectable with said main portion upon removal of said first mentioned second portion and has apertures in register with said additional positioning means to allow for movement of said additional positioning means to said extended position on actuation of said second resilient means.

11. Apparatus as defined in claim 10, further comprising spring-biased pusher means for engaging one marginal portion of a web which is positioned by said first mentioned positioning means or is advanced by said advancing means, said additional second portion having means for maintaining said pusher means out of contact with a web having a data carrying strip.

* * * * *